United States Patent [19]
Wheeler

[11] Patent Number: 5,425,910
[45] Date of Patent: Jun. 20, 1995

[54] RESIN WALL FORMATION FOR COLLAPSIBLE SHIPPING CONTAINER

[75] Inventor: William E. Wheeler, Sodus, N.Y.

[73] Assignee: A. R. Arena Products, Inc., Rochester, N.Y.

[21] Appl. No.: 199,738

[22] Filed: Feb. 22, 1994

Related U.S. Application Data

[63] Continuation of Ser. No. 999,107, Dec. 31, 1992, abandoned.

[51] Int. Cl.[6] .................................................. B29C 70/20
[52] U.S. Cl. ...................................... 264/108; 220/6; 264/257; 264/325
[58] Field of Search ............... 264/108, 257, 258, 294, 264/325, 77; 220/6, 452

[56] References Cited

U.S. PATENT DOCUMENTS

| | | | |
|---|---|---|---|
| 1,674,296 | 6/1928 | Peters et al. | 220/645 |
| 2,676,729 | 4/1954 | Neville, Jr. et al. | 220/645 |
| 2,717,716 | 9/1955 | Farrar | 220/6 |
| 2,720,998 | 10/1955 | Potter | 220/6 |
| 2,855,966 | 10/1958 | Lewis | 220/6 |
| 3,424,365 | 1/1969 | Venturi | 220/6 |
| 3,449,482 | 6/1969 | Mitchell et al. | 264/108 |
| 3,497,127 | 2/1970 | Box | 220/6 |
| 3,700,512 | 10/1972 | Pearson et al. | 220/414 |
| 3,925,132 | 12/1975 | Bartlow et al. | 220/592 |
| 3,966,072 | 6/1976 | Gonzales et al. | 220/7 |
| 4,014,970 | 3/1977 | Jahnle | 264/325 |
| 4,044,188 | 8/1977 | Segal | 264/108 |
| 4,171,751 | 10/1979 | Schutz | 220/669 |
| 4,434,021 | 2/1984 | Robinson et al. | 220/453 |
| 4,636,422 | 1/1986 | Harris et al. | 264/257 |
| 4,775,068 | 10/1988 | Reiland et al. | 220/6 |
| 4,781,300 | 11/1988 | Long | 220/6 |
| 5,180,190 | 1/1993 | Kersey et al. | 220/565 |

FOREIGN PATENT DOCUMENTS

| | | | |
|---|---|---|---|
| 53-9874 | 1/1978 | Japan | 264/108 |
| 56-130802 | 10/1981 | Japan | 264/108 |
| 63-87206 | 4/1988 | Japan | 264/257 |

Primary Examiner—Jay H. Woo
Assistant Examiner—Robert B. Davis
Attorney, Agent, or Firm—Eugene Stephens & Associates

[57] ABSTRACT

A fiber-reinforced resin wall of a collapsible shipping container large enough and strong enough for shipping about 300 gallons of liquid is made by compression molding a laminate formed of a glass fiber mat sandwiched between resin webs. This material is arranged in a central region of a compression mold cavity for a wall of the container so that the flow of material during compression molding runs laterally from a central region to side edge regions of the molded wall. Horizontal corrugations extend in the same direction as the lateral flow of material and are not intersected by any transverse ribs so that the flow along the horizontal corrugations is not deviated from the lateral direction. This laterally orients the fibers and optimizes the strength of the wall in the horizontal direction, which is important for bulk shipping requirements.

10 Claims, 2 Drawing Sheets

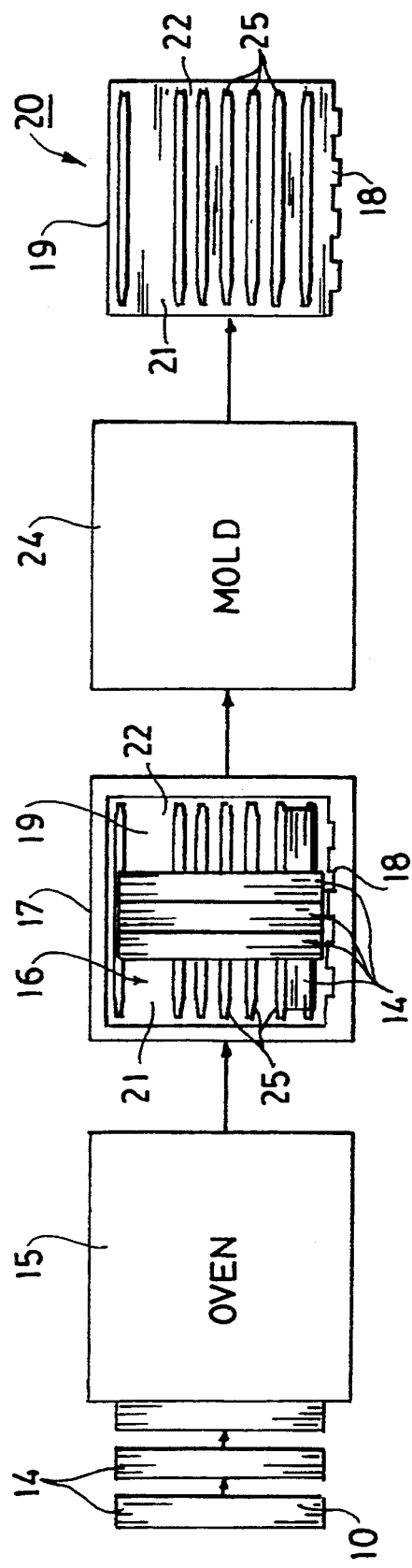
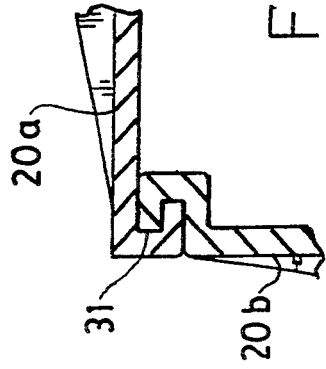
FIG.4
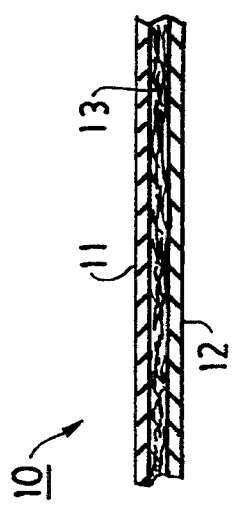
FIG.2

RESIN WALL FORMATION FOR COLLAPSIBLE SHIPPING CONTAINER

RELATED APPLICATIONS

This is a continuation of parent Application Ser. No. 07/999,107, filed 31 Dec. 1992, by William E. Wheeler, entitled RESIN WALL FORMATION FOR COLLAPSIBLE SHIPPING CONTAINER, and now abandoned.

BACKGROUND

Although there have been many attempts to make collapsible shipping containers of molded resin materials, these containers have not been large enough and strong enough for holding 300 gallons or more of liquid materials. Such a size and capacity is desirable for the loading of trucks and railroad cars; and the ability to hold liquid materials is desirable for shipping food products, chemicals, and many pourable, bulk materials. Collapsibility is desirable so that empty containers are compact on return shipment.

Collapsible metal containers have been made strong enough for these purposes; but they are expensive, heavy, and easily damaged. Non-collapsible and non-reusable containers have also succeeded, but these tend to be more expensive than collapsible and reusable containers.

The invention involves a way of making resin walls of a collapsible shipping container strong enough so that the container can be used repeatedly for shipments of about 300 gallons or more of liquid and comparable density materials. The inventive solution allows a collapsible container to take advantage of the desirable characteristics of molded resin, while being large enough and strong enough to meet the shipping needs of many materials.

SUMMARY OF THE INVENTION

The inventive discovery is that proper selection of a fiber-reinforced resin material, a compression molding process, and a configuration of collapsible wall allows a shipping container to be made large enough and strong enough so that the container walls can withstand shipping forces while reliably containing about 300 gallons or more of liquid material, which can weigh 2400 pounds or more. This can be accomplished by using a moderate amount of material in each of the container walls so that the complete container is inexpensive enough to be priced competitively.

The resin material preferably selected is a laminate that sandwiches a glass fiber mat between a pair of resin webs. This is cut into predetermined sizes of sheets that are preheated to soften them for molding. The softened sheets are arranged in a central region of a compression mold cavity so that when the mold is closed and the resin material is compressed, it flows from the central region to the lateral edge regions of the cavity. The mold cavity shape includes horizontal corrugations extending through the central region between the lateral side edge regions, and the lateral resin flow along these corrugations orients the fiber mat to extend from the central region to the side edge regions.

The cavity and molded wall configuration avoids transverse diversion of the lateral flow between the central region and the side edge regions so that the fiber mat, in extending toward the side edge regions, is not bent away from the lateral direction. The horizontal corrugations in the molded wall are untraversed by any rib configurations that are vertical or otherwise transverse to the horizontal direction of the corrugations. This is counter to accepted practice in molding large resin container walls for strength, but I have found that eliminating ribs transverse to the horizontal corrugations makes the walls stronger than if such ribs are present.

DRAWINGS

FIG. 1 is a schematic diagram of a method for molding resin walls for a collapsible shipping container according to the invention.

FIG. 2 is a schematic and fragmentary end view of a resin and glass fiber laminate material for use in making container walls according to the invention.

FIG. 4 is a fragmentary plan view of a corner configuration for the walls of the container of FIG. 3.

DETAILED DESCRIPTION

Figure 3:
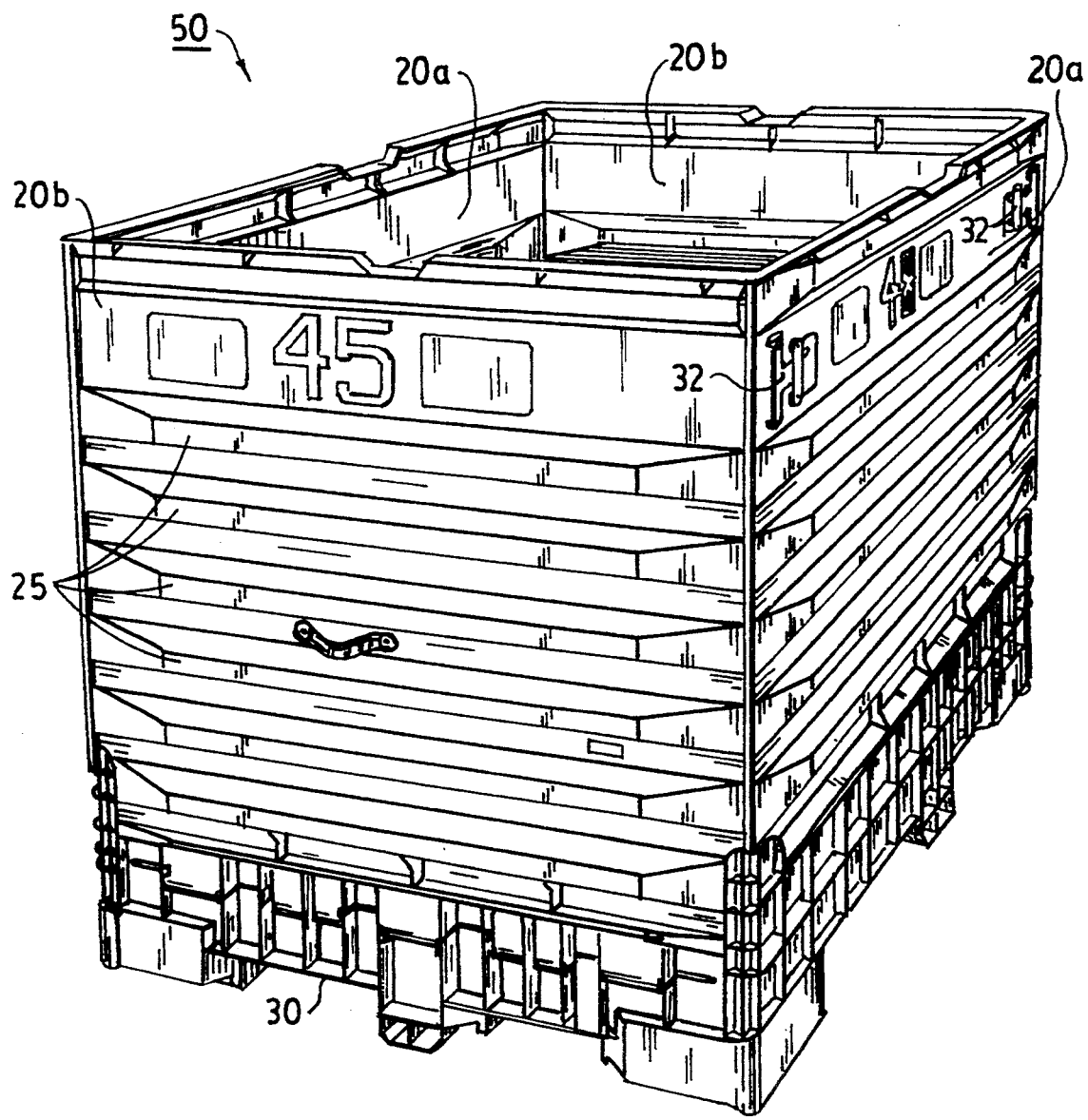
FIG. 3 is a perspective view of a preferred embodiment of a collapsible container having four walls made according to the invention and assembled on a molded base.

The shipping container that is the subject of the invention is intended to meet the needs of the bulk material shipping industry, including the need for shipping liquid. It is collapsible, to be more compact on return shipment, and is molded of resin material, for economy of fabrication and durability. To contain a reasonable amount of material for loading onto trucks and railroad cars and for handling by forklifts, the preferred container is about three feet deep, four feet long, and slightly less than four feet wide. It can be lined with a plastic bag and provided with a cover, can be stacked two high when loaded, and is intended to withstand the banging and bumps that occur during shipment.

To meet all these requirements without using an excess of expensive resin material, the walls of the container have to be made exceptionally strong. Experience indicates that resin walls for such a container must be reinforced with fibrous material, and glass fibers are preferred for this. The preferred resin material is a laminate 10 such as schematically shown in FIG. 2. It includes a pair of resin webs 11 and 12 bonded to opposite sides of a mat 13 formed of indefinite lengths of glass fibers. The long lengths of glass fibers in mat 13 sandwiched between resin webs 11 and 12 make laminate 10 an exceptionally strong resin material. A preferred form of this, using polypropylene resin, is available from AZDEL, Inc. under the "AZDEL" trademark.

Molding one of the four walls 20 of collapsible container 50, illustrated in FIG. 3, begins with cut sheets 14 of laminate 10, as shown at the left end of FIG. 1. Sheets 14 are fed into oven 15 where the sheets are heated and softened in preparation for compression molding. The softened sheets are then arranged within cavity 16 of a compression mold part 17. Cavity 16 has a bottom region 18, a top region 19, and a pair of side edge regions 21 and 22 corresponding to similar regions of molded wall 20. Cavity 16 is also configured with horizontally extending corrugations 25 arranged between side edge regions 21 and 22.

Softened sheets 14 are arranged horizontally along bottom edge region 18 and vertically in a central cavity region 23 where sheets 14 are stacked on top of each other to provide an adequate amount of material for molding wall 20. After softened sheets 14 are arranged in mold cavity 16, another mold part 24 is closed over mold part 17 with compressive force that makes the softened sheets 14 flow into the extremities of cavity 16 to form wall 20.

The configuration of corrugations 25 in cavity 16 and the flow of resin and fiber mat materials from central region 23 to edge regions 21 and 22 is important for the strength of the resulting wall 20. This lateral flow moves resin and glass fiber mat laterally along corrugations 25 so that the glass fibers of the mats 13 in resin sheets 14 are oriented laterally toward sides 21 and 22. The glass fibers do not end up perfectly parallel to each other along horizontal lines, but more of the fibers extend horizontally than in other directions; and this enhances the horizontal tensile strength of the molded wall 20.

It is important that the fibrous mats not be bent or diverted away from the horizontal direction of corrugations 25 as the material flow occurs during compression molding. Experience has shown, for example, that vertical ribs intersecting horizontal corrugations 25 will cause bending of the glass fiber mat from its lateral direction and such bending or diverting of the glass fiber mat weakens wall 20, rather than strengthening it. In effect, any rib configuration transverse to the horizontal corrugations can cause a U-shape bend in the laterally oriented fibers, as they are formed into the contour of such a rib. This bend weakens the tensile strength of the fiber mat in the horizontal direction and is most pronounced in regions where the fiber mat flows laterally. Avoiding ribs transverse to the horizontal corrugations avoids such bends in the glass fibers and strengthens wall 20 enough so that a moderate amount of resin material can make wall 20 meet bulk shipping requirements.

Four of the walls 20 are molded in suitable configurations to be assembled on an injection molded base 30 to form liquid shipping container 50, as shown in FIG. 3. Walls 20 are all hingedly mounted on base 30 so that they can fold inward and overlap each other to collapse container 50 down to a compact size for return shipment. When erected, as shown in FIG. 3, walls 20 preferably interlock at each corner of container 50 and are preferably latched in place against collapsing inward. They are also securely supported on base 30, which is preferably configured to ensure that walls 20 interlock securely at corners and are braced against inward and outward forces.

A preferred form of wall interlock is illustrated in FIG. 4, between container walls 20a and 20b. Interlock 31 prevents either wall from moving outward. Wall 20b is preferably latched in its outward illustrated position by latches 32 arranged on wall 20a. When latches 32 are released, wall 20b can fold inward; and after a pair of opposite walls 20b are folded, opposite walls 20a can be folded in on top of walls 20b.

Walls 20 are preferably extra thick along their bottom edges 18 and their lateral edges 21 and 22. This strengthens the hinges and the bracing against base 30 along bottom edge 18 and strengthens the interlocks 31 at corner regions of container 50. Thickening lateral edges 21 and 22 requires an adequate lateral flow of molding material and helps ensure lateral orientation of fibrous mats 13 along the length of horizontal corrugations 25. This strengthens the walls, providing the lateral flow does not traverse any flow-bending ribs.

I claim:

1. A method of molding an independently erectable, fiber-reinforced resin wall of a collapsible container large enough and strong enough for shipping about 300 gallons of liquid, said method using a compression mold defining a cavity having regions corresponding to regions of said wall, including bottom, top, and side edge regions, and a central region between said side edge regions, said method comprising:
   a. selecting a molding material formed of glass fibers combined with resin material that engulfs the glass fibers and is flowable with the glass fibers for molding purposes;
   b. preheating and arranging said molding material in said central region of said mold cavity to extend between said bottom and top regions;
   c. compression molding said material to flow said material laterally from said central region to said side edge regions;
   d. directing said lateral flow from said central region to said side edge regions to proceed along horizontally extending corrugations so that said lateral flow orients the glass fibers in said material to extend in the direction of the lateral flow from said central region to said side edge regions; and
   e. avoiding transverse diversion of said lateral flow between said central region and said side edge regions so that said glass fibers extending laterally towards said side edge regions are not diverted from said lateral direction along said horizontally extending corrugations.

2. The method of claim 1 including flowing along said bottom edge region more of said molding material per unit of wall area than remains in said central region.

3. The method of claim 1 wherein the molding material is formed as a glass fiber mat laminated between a pair of resin webs and cut into predetermined sizes of sheets before heating.

4. The method of claim 3 including arranging at least one of said sheets to extend along said bottom edge region between said side edge regions.

5. The method of claim 1 including flowing into said side edge regions more of said molding material per unit of wall area than remains in said central region.

6. The method of claim 1 applied to four of said walls arranged to be independently erectable on a molded base to form said collapsible container.

7. A method of molding a fiber glass reinforced wall for a collapsible shipping container, the method comprising:
   a. heating a molding material that combines resin with reinforcing glass fibers;
   b. placing in a central region of a compression mold enough of the heated molding material to form the container wall; and
   c. compressing the material within the central region of the mold so that the material is forced to flow from the central region of the mold toward lateral side edges of the mold along horizontal corrugations that extend from the central region toward the lateral side edges so that the flow proceeding laterally along the corrugations orients the fibers to extend laterally in the direction of the flow and gives the container wall sufficient strength to retain about 300 gallons of liquid within the container for shipment.

8. The method of claim 7 including flowing along a bottom edge region of the mold more of said molding material per unit of wall area than remains in the central region.

9. The method of claim 7 including flowing into the lateral side regions more of the molding material per unit of wall area that remains in the central region.

10. The method of claim 7 applied to four of said walls arranged to be independently erectable on a molded base to form said collapsible container.

* * * * *